United States Patent Office 2,920,062
Patented Jan. 5, 1960

2,920,062

PROCESS FOR THE POLYMERIZATION OF ALPHA-OLEFINS

John William McFarland, Wilmington, Del., assignor to E. I. du Pont de Nemours and Company, Wilmington, Del., a corporation of Delaware No Drawing. Application May 7, 1957
Serial No. 657,488

6 Claims. (Cl. 260—79.3)

This invention is directed to the polymerization of olefins and more particularly to the polymerization of alpha-olefins to polymers of high molecular weight in solution, which polymers may subsequently be directly chlorinated and chlorosulfonated in the same solution.

Ethylene and other alpha-olefins may be polymerized, even at moderate temperatures and pressures, by means of the so-called coordination catalysts usually made from compounds of metals of groups IV to VIB and organometallic compounds of elements of groups I, II and IIIA. In addition to the convenience of these moderate conditions, the process has further advantages, such as giving almost entirely linear polyethylenes and readily giving high-molecular homopolymers and copolymers of the higher olefins which are difficult or impossible to obtain by other polymerization methods. These polymers and copolymers have valuable properties themselves and are also valuable intermediates for elastomeric and other chlorination and chlorosulfonation products. In making the latter, according to present methods, the olefin is first polymerized in a dilute solution in an aliphatic or cycloaliphatic hydrocarbon, and the polymer is then isolated by precipitation with an alcohol or by distilling off the solvent. The solid polymer is then redissolved in a highly chlorinated solvent such as carbon tetrachloride, treated with chlorine and surfur dioxide, and finally isolated as the final product. Obviously, it would be simpler and cheaper to carry out the polymerization and chlorination or chlorosulfonation in the same solution, thus eliminating the steps of isolating and then redissolving the olefin polymers and further eliminating the use of a second quantity of solvent. No solvent, however, which is known to be suitable for one reaction is generally suitable for the other. Thus the catalytic polymerization, since the catalyst contains highly reactive organometallic compounds, can be carried out in only the least reactive solvents. Thus, even carbon tetrachloride in which the chlorinations and chlorosulfonations are usually carried out is not generally suitable, since in some cases it either poisons the polymerization catalysts or gives liquid polymers of very low molecular weight. On the other hand, the aliphatic and cycloaliphatic hydrocarbons, the commonly used organic solvents for the catalytic polymerization, obviously are far too reactive toward chlorine to be used as solvents for chlorination.

It is an object of the present invention to provide a new solvent of different type in which the polymerization of olefins to products of high molecular weight may be carried out by means of coordination catalyst.

It is a further object of the present invention to provide a solvent in which both olefin polymerization and subsequent chlorination or chlorosulfonation of the olefin product may be carried out in the same solution.

These and other objects will become apparent in the following description and claims.

It has been discovered that silicon tetrachloride is a suitable solvent for both the polymerization and the chlorination and chlorosulfonation reactions.

More specifically, the present invention is directed to a process of polymerizing alpha-olefins in silicon tetrachloride by means of a catalyst made from a compound of a metal of groups IVB, VB and VIB of the periodic table and an organometallic compound of a metal of group IA, IIA, or IIIA.

The suitability of silicon tetrachloride as solvent for the polymerization of olefins by means of catalysts containing very reactive organometallic compounds is definitely unexpected. As explained above, the closely related carbon tetrachloride is generally unsuitable. On the other hand, titanium tetrachloride, containing the element following carbon and silicon in group IV of the periodic table, is itself one of the ingredients of the highly active polymerization catalyst.

The catalysts for olefin polymerization, which have been found to be active in a silicon tetrachloride medium, appear to be identical with the coordination catalysts prepared in aliphatic hydrocarbons and are made from the same metallic compounds, as illustrated in the following examples, by the reaction of at least one compound, such as a halide, of a metal of groups IV to VIB, such as titanium, zirconium, thorium, vanadium, chromium, molybdenum, tungsten, and uranium, with at least one organometallic compound of an element of groups I to IIIA, such as lithium, sodium, potassium, magnesium, zinc, cadmium, and aluminum. The organic part of these organometallic compounds is preferably an alkyl group, either long or short, such as methyl, butyl, or dodecyl, although aryl groups are also effective. Aluminum alkyls, in which the alkyl group is dodecyl, for example, are conveniently made by the reaction of lithium aluminum hydride with dodecene. Not all the valences of the metals need to be attached to organic groups. Thus the Grignard reagents are suitable organometallic compounds for making the catalysts. The ratio of the organometallic compound to the compound of groups IVB, VB or VIB is such as to reduce at least part of the latter to a valence of two. Mixtures of compounds of two or more metals of groups I to IIIA or of IV to VIB may often be used to advantage.

The present invention does not reside in the coordination catalyst itself but in the use of silicon tetrachloride as the medium for these catalysts which appear to be the same in silicon tetrachloride as in the conventional hydrocarbon solvents. Known procedures already developed for making and using coordination catalysts, for example, the necessity of rigorously excluding water and oxygen, may be applied in the present invention. The polymerization may be carried out over a wide range of temperatures, 0 to 200° C. being entirely practical and 20 to 100° being preferred. Any pressure, so long as it is sufficient to keep the silicon tetrachloride in the liquid phase at the temperature used, is suitable. Pressures up to 2000 atmospheres are practical; those between about one and 100 atmospheres are preferred. Neither the high temperatures or high pressures required for the polymerization of ethylene with other catalysts are required here.

The quantity of catalyst used depends on the olefin to be polymerized and the speed of polymerization desired. The higher olefins in general polymerize more slowly. The catalyst from one mol of the group IVB, VB, or VIB metal compound will readily polymerize at least 100 mols of olefin and may be used for 1000 or more.

The olefin polymerized must be an alpha-olefin, that is, its double bond must be in the structure —CH=CH$_2$. The rest of the molecule may be hydrogen or an alkyl group with either straight or branched chain. Thus suitable olefins are ethylene, propylene, butene-1, pentene-1, hexene-1, 3-methyl butene, and the like as well as their higher homologs, containing up to 18 or more carbon atoms. Mixtures of two or more olefins may be copolymerized by this method. Since the polymers prepared according to the present invention give valuable products upon chlorination or chlorosulfonation, the olefins particularly suitable for this purpose, such as ethylene, propylene, and their mixtures, are particularly preferred.

The medium in which the polymerization is carried out is silicon tetrachloride. It is sometimes convenient for this medium to contain a minor amount of an aliphatic or cycloaliphatic hydrocarbon of the type in which the coordination catalysts are conventionally made and used. When not more than about 10% of such hydrocarbons are present, subsequent chlorination and sulfochlorination may be carried out without difficulty from reaction of the hydrocarbon solvent. Since the high polymers formed give viscous solutions, it is convenient to use amounts of silicon tetrachloride which will give moderately viscous solutions containing from 5 to 20% of the polymer. Such solutions are also suitable for chlorination and sulfochlorination.

The chlorination and chlorosulfonation of the solutions of polyolefins in silicon tetrachloride made according to the present invention may be carried out like the conventional reactions in carbon tetrachloride solution, except that it is even more important to have anhydrous conditions. Variations in the procedure are given in U.S. 2,586,363. Both the chlorination and sulfochlorination may be catalyzed by substances giving free radicals, as discussed in U.S. Patents 2,503,252, and 2,503,253 and 2,640,048, and, by exposure to light. Up to about 50% chlorine and about 10% sulfur are ordinarily introduced. The properties of the products will vary with the chlorine and sulfur content and with the composition and structure of the polymer treated.

Representative examples illustrating the present invention follow.

Example 1

The catalyst was prepared under nitrogen in 50 ml. of silicon tetrachloride solvent by adding 0.022 mol (4.35 g.) of aluminum tri-isobutyl in 27.5 ml. of cyclohexane solution, and 0.005 mol (0.95 g.) $TiCl_4$. An additional 400 ml. of silicon tetrachloride was added to the resulting black catalyst. A stream containing approximately 25% propylene and 75% ethylene by volume was passed into the flask with agitation under a few mm. positive pressure. Practically all the gas was absorbed. The temperature of polymerization was 30–40° C. After 6.5 hours, when about 40 g. of gas had been absorbed, isopropyl alcohol (15 ml.) was added to deactivate the catalyst.

Without isolating the polymer, the mixture was heated under reflux with nitrogen bubbling under the surface for 30 minutes. Then 0.10 g. of alpha,alpha'-azo-bis(isobutyronitrile) catalyst was added. With the light from a 1000-watt electric filament bulb concentrated on the flask, 25 g. of chlorine was bubbled under the surface of the liquid for two hours at 54–56° C. and during the next two hours a combination of 25 g. of chlorine and 25 g. of sulfur dioxide added at the same temperature. Hydrogen chloride and unreacted chlorine and sulfur dioxide were removed by passing nitrogen through the solution for 30 minutes at reflux temperature (57° C.) and then 0.75 g. of the condensation product of two mols of epichlorhydrin with one of p,p'-dihydroxy diphenyl dimethyl methane was added as a stabilizer. The solvent was removed by distillation. The resulting elastomeric product, washed with isopropyl alcohol, weighed 40 g. and contained 18.9% chlorine and 1.75% sulfur.

The chlorosulfonated polymer was compounded according to the following recipe and cured at 153° C. for 30 minutes.

|  | Parts |
| --- | --- |
| Polymer | 100 |
| Carbon black | 50 |
| Hydrogenated rosin | 2.5 |
| Litharge | 40 |
| Plasticizing hydrocarbon oil | 15 |
| Benzothiazyl disulfide | 0.75 |
| Dipentamethylene thiuram tetrasulfide | 0.75 |

The cured elastomer exhibited the properties listed below.

| Temp. of Test | Tensile Strength, p.s.i. | Modulus | | Elongation at Break, percent |
| --- | --- | --- | --- | --- |
| | | $M_{100}$, p.s.i. | $M_{200}$, p.s.i. | |
| 25° | 1,550 | 640 | 1,400 | 225% |
| 75° | 860 | 325 | 730 | 230 |

Resilience = 53%
Compression set = 53%
Shore hardness = 76

Example 2

Into a dry two-liter flask were added under nitrogen 25 ml. of silicon tetrachloride, 25 ml. of a cyclohexane solution containing 3.96 (0.02 mol) of aluminum triisobutyl and 1.10 ml. (0.01 mol) of titanium tetrachloride with stirring. An additional 650 ml. of silicon tetrachloride was then added. Nitrogen was flushed from the flask with ethylene and then agitation begun and ethylene allowed to pass into the flask above the mixture at the rate at which it was absorbed. The pressure was kept at atmospheric pressure. During 3⅔ hours polymerization was carried out at 43–48° C. Isopropyl alcohol (20 cc.) was then added to deactivate catalyst and the silicon tetrachloride was removed under reduced pressure. Resulting white residue, washed with isopropyl alcohol and dried, weighed 72 g.

Example 3

The catalyst was prepared as before under nitrogen by adding successively 100 ml. of silicon tetrachloride, 12.5 ml. of a cyclohexane solution containing 1.98 g. (0.01 mol) of aluminum triisobutyl and 5 ml. of cyclohexane solution containing 0.95 g. (0.005 mol) of titanium tetrachloride. Then an additional 150 ml. of silicon tetrachloride was added to the dark brown mixture. A 1:1 molar mixture of ethylene and propylene was polymerized at 38–47° C. and approximately 100 mm. positive mercury pressure during three hours. The solvent was removed under reduced pressure and residue washed with ethanol. The elastomeric polymer weighed 31 g., contained 44% propylene by infrared analysis, and had a melt index of 4.86.

Example 4

The catalyst was prepared under nitrogen in 25 ml. of silicon tetrachloride from 1.98 g. (0.01 mol) of aluminum triisobutyl in 12.5 ml. cyclohexane solution, and 0.87 g. (0.005 mol) of vanadium oxychloride ($VOCl_3$) in 5 ml. of cyclohexane solution. To the black mixture was added 450 ml. more of silicon tetrachloride. An ethylene/propylene mixture containing 30.7% propylene was passed into the flask with stirring during five hours at 26–36° C. and 100–120 mm. positive pressure. Isopropyl alcohol (10 cc.) was then added to deactivate the catalyst. The resulting mixture was chlorosulfonated as in Example 1 with 30 g. $Cl_2$ and 15 g. $SO_2$. The isolated elastomer (21.5 g.) contained 4.6% Cl and 0.24% S.

Example 5

Catalyst was prepared as before under nitrogen in 100 ml. silicon tetrachloride from 0.01 mol of aluminum triisobutyl and 0.005 mol of titanium tetrachloride. An additional 100 ml. of silicon tetrachloride was added. Hexene-1 (50.5 g.) was added and the mixture stirred at 27.5–33° C. for 1¾ hours. The solvent was removed by distillation, cyclohexane added and distillation continued until the boiling point reached 80° C. The mixture was poured into isopropyl alcohol and the precipitated polymer collected and dried. The heavy waxy polymer amounted to 40 g.

*Example 6*

Two dried and nitrogen-flushed 450 ml. stainless steel shaker tubes were connected in series. Into the first tube had been condensed, at −70° C., 50 g. of propylene and 65 g. of ethylene. Into the second tube had been placed 125 ml. silicon tetrachloride, 0.01 mol aluminum triisobutyl and 0.005 mol titanium tetrachloride. Both bombs were heated to 100° C. and the second was pressured to 500 p.s.i.g. by opening valve between bombs. After keeping the second at 100° C. and 400–500 p.s.i.g. for one hour, it was cooled and the tough polymer and solvent were removed. The solvent was distilled off and "chased" by cyclohexane. The addition of isopropyl alcohol to mixture gave 36 g. of tough solid polymer.

*Example 7*

The catalyst was prepared under nitrogen by adding consecutively, with stirring, 25 ml. of silicon tetrachloride, 22.5 ml. of cyclohexane solution containing 0.018 mol (2.77 g.) of aluminum triisobutyl, and 0.0068 mol (1.05 g.) of chromyl chloride. An additional 200 ml. of silicon tetrachloride was added to the brown slurry of catalyst. Ethylene gas was passed into the flask with stirring at 32.5–45.8° C. for 2¾ hours under two inches of mercury positive pressure. The solvent was removed in vacuo and the resulting powdery white polymer washed with isopropyl alcohol, filtered and dried. The product amounted to 20.5 g.

*Example 8*

The catalyst was prepared under nitrogen by adding, consecutively with stirring 25 ml. of silicon tetrachloride, 0.03 mol (1.9 g.) of n-butyllithium in 50 ml. of n-pentane, 0.01 mol (1.9 g.) of titanium tetrachloride, and 250 ml. of silicon tetrachloride. Ethylene gas was passed into flask at 1–2 inches of positive mercury pressure during three hours at 29–41° C. Solvent was removed under reduced pressure. The residue was washed well with isopropyl alcohol, filtered, and dried. The white, granular product amounted to 13 g.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of polymerizing alpha-olefins containing up to 18 carbon atoms at a temperature within the range of 0–200° C., said polymerization being conducted in the presence of a coordination catalyst prepared from (1) at least one halide compound taken from the group consisting of a halide of a metal taken from the group consisting of titanium, zirconium, thorium, vanadium, chromium, molybdenum, tungsten, and uranium, and, (2) at least one organometallic compound containing at least one hydrocarbon group attached directly to a metal taken from the group consisting of lithium, sodium, potassium, magnesium, zinc, cadmium, and aluminum, the improvement wherein said polymerization is conducted in silicon tetrachloride as solvent, said silicon tetrachloride solvent containing at least 90% by volume of silicon tetrachloride and not more than 10% by volume of hydrocarbon solvent.

2. The process of claim 1 followed by chlorinating the resulting polymer in the same solvent solution.

3. The process of claim 1 followed by chlorosulfonating the resulting polymer in the same solvent solution.

4. In the process of polymerizing alpha-olefins containing not more than 3 carbon atoms at a temperature within the range of 20–100° C., said polymerization being conducted in the presence of a coordination catalyst prepared from (1) a titanium halide, and, (2) an organo metallic aluminum compound, the improvement wherein said polymerization is conducted in silicon tetrachloride as solvent, said silicon tetrachloride solvent containing at least 90% by volume of silicon tetrachloride and not more than 10% by volume of hydrocarbon solvent.

5. The process of claim 4 followed by chlorinating the resulting polymer in the same solvent solution.

6. The process of claim 4 followed by chlorosulfonating the resulting polymer in the same solvent solution.

References Cited in the file of this patent

UNITED STATES PATENTS

| | | |
|---|---|---|
| 2,405,971 | McAlevy | Aug. 20, 1946 |
| 2,407,181 | Scott | Sept. 3, 1946 |
| 2,586,363 | McAlevy | Feb. 19, 1952 |
| 2,849,431 | Baxter | Aug. 26, 1958 |

FOREIGN PATENTS

| | | |
|---|---|---|
| 533,362 | Belgium | May 16, 1955 |

OTHER REFERENCES

Gilman: Organic Chemistry, page 520, vol. I, second edition, John Wiley, 1953.